J. I. MOORE.
POWER TRANSMISSION MECHANISM.
APPLICATION FILED APR. 28, 1919.

1,347,961.

Patented July 27, 1920.
3 SHEETS—SHEET 1.

Witness
C. D. Kesler
Chas. S. Hyer

Inventor
John Ivan Moore
By James L. Norris
Attorney

J. I. MOORE.
POWER TRANSMISSION MECHANISM.
APPLICATION FILED APR. 28, 1919.
1,347,961.
Patented July 27, 1920.
3 SHEETS—SHEET 2.
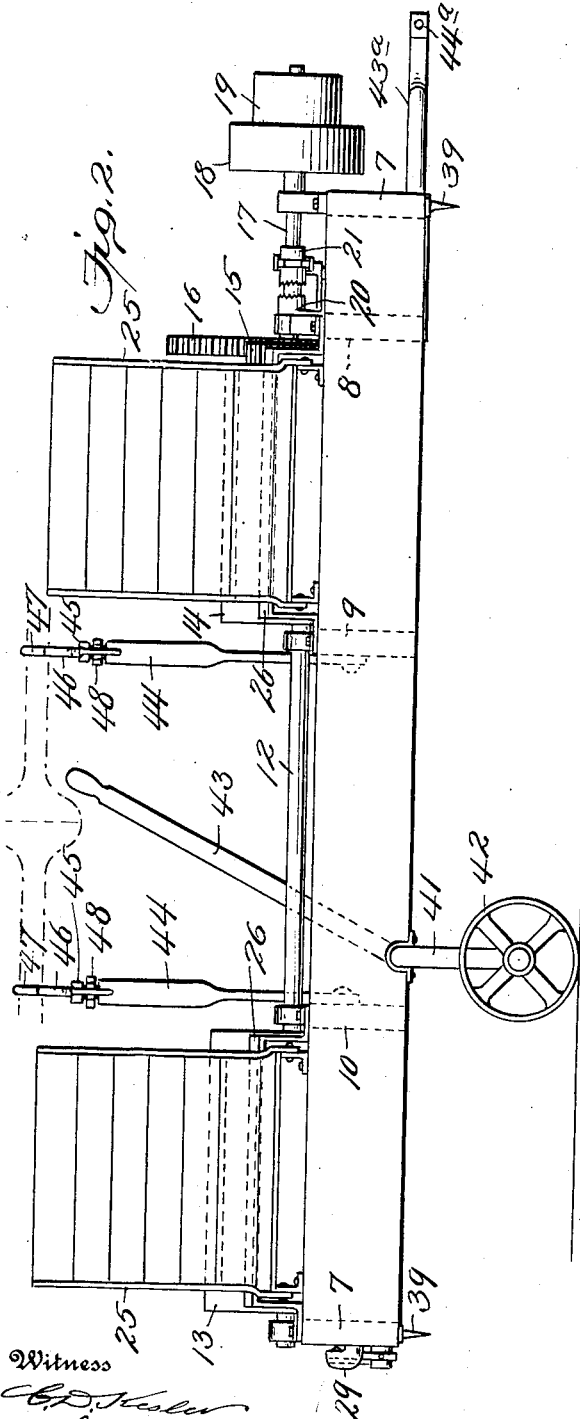
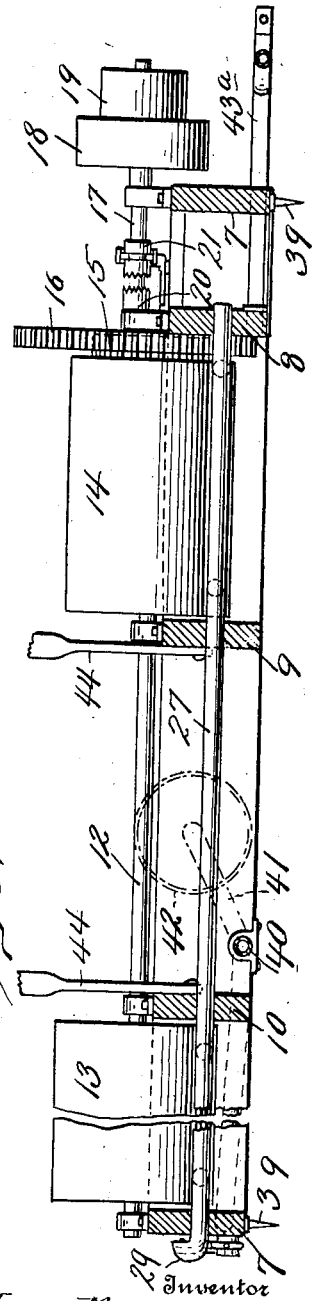
Witness
C. D. Kesler
Chas. S. Hyer.
Inventor
John Ivan Moore
By James L. Norris
Attorney

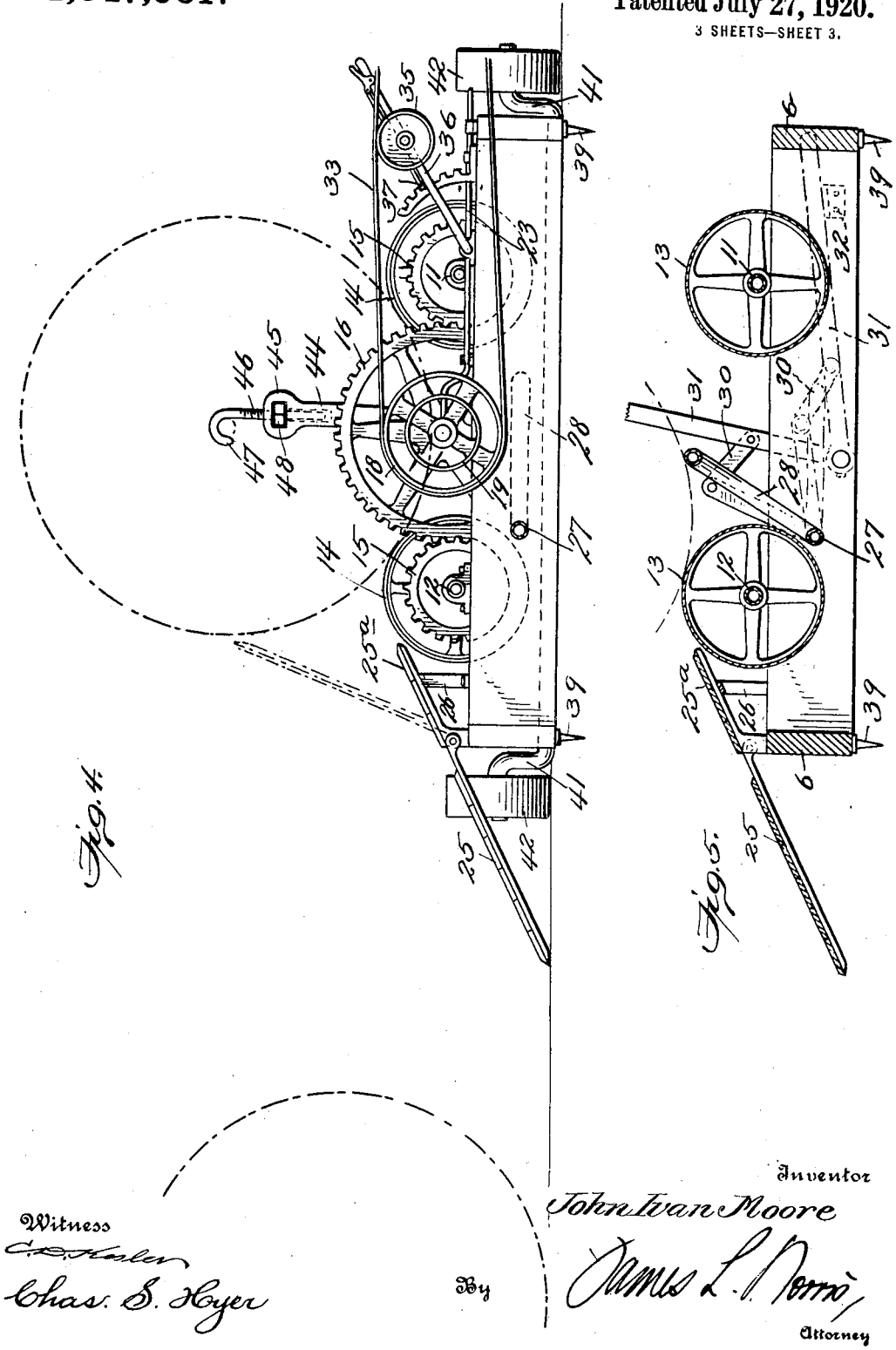

UNITED STATES PATENT OFFICE.

JOHN IVAN MOORE, OF BUTLER, MISSOURI.

POWER-TRANSMISSION MECHANISM.

1,347,961.  Specification of Letters Patent.  Patented July 27, 1920.

Application filed April 28, 1919. Serial No. 293,196.

*To all whom it may concern:*

Be it known that I, JOHN IVAN MOORE, a citizen of the United States, residing at Butler, in the county of Bates and State of Missouri, have invented new and useful Improvements in Power-Transmission Mechanism, of which the following is a specification.

This invention relates to power transmission mechanism, and the primary object of the invention is the provision of a portable organization of inter-acting elements designed for the transmission of power from the driving wheels of motor vehicles such as automobiles, and which may also be readily transported from one place to another by being coupled up to a motor vehicle. A further object of the invention is to provide a novel construction of power transmitting mechanism upon which the driving wheels of a motor may be readily mounted or removed, and also having a positive or direct power transmitting operation.

With these and other objects and advantages in view, the invention consists in the construction and arrangement of the several parts which will be more fully hereinafter described and claimed.

In the drawings:—

Fig. 2 is a side elevation of the same;

Fig. 3 is a longitudinal vertical section taken in the plane of the line 3—3, Fig. 1, the mechanism being broken through in part;

Fig. 4 is an end elevation of the improved mechanism; and

Fig. 5 is a transverse vertical section taken in the plane of the line 5—5, Fig. 1.

Figure 1:
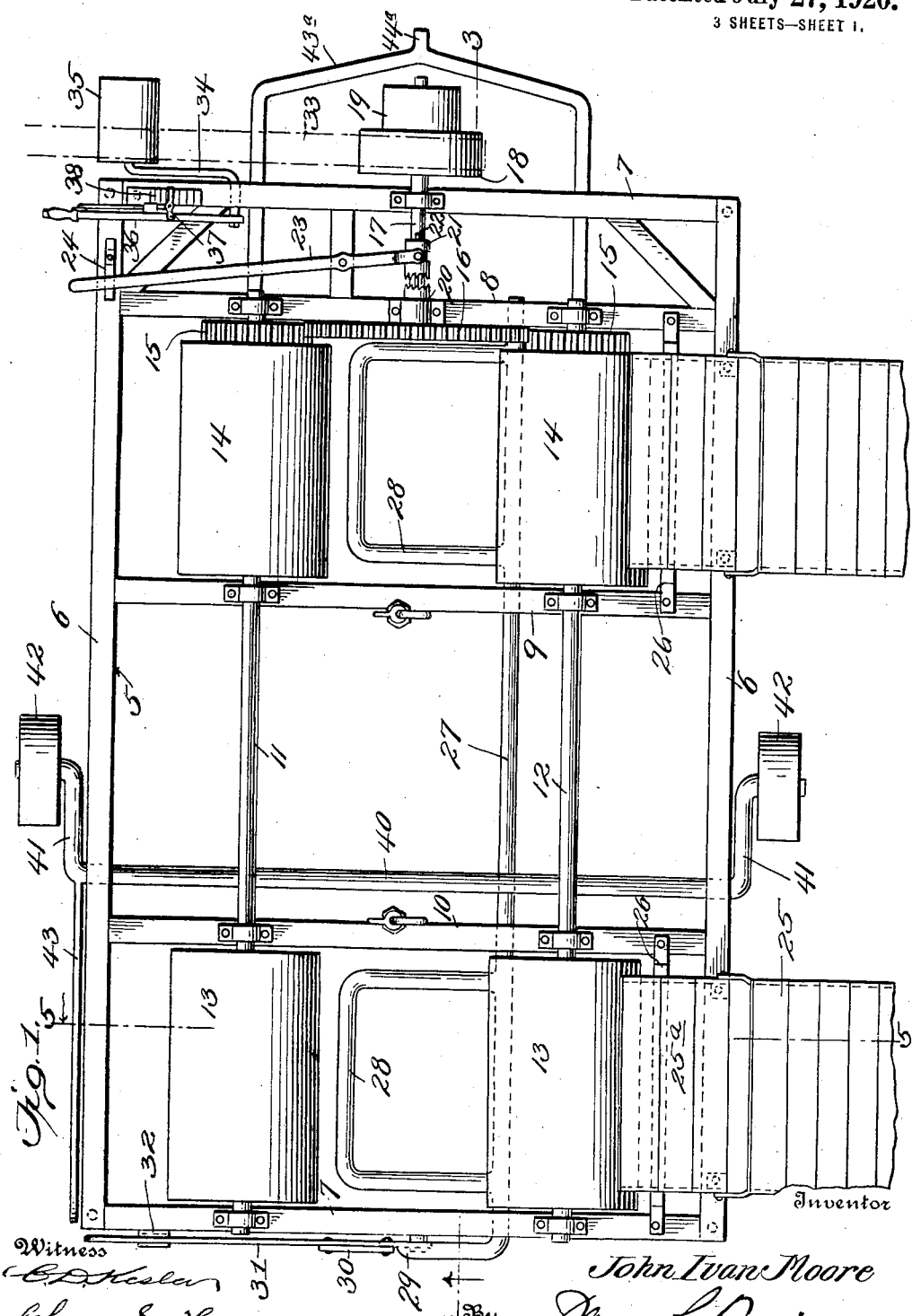
Figure 1 is a top plan view of a power transmitting mechanism embodying the features of the invention.

The numeral 5 designates a frame which is composed of longitudinal side bars 6, connected by end bars 7, intermediate transverse supporting bars 8, 9 and 10 being arranged in proper spaced relation between the end bars 7 and secured to the side bars 6 by suitable means. Mounted on the end bars 7 and the intermediate transverse bars 8, 9 and 10 are two shafts 11 and 12 each carrying a pair of frictional rollers 13 and 14, respectively located between the bars 8 and 9 and 7 and 10, these rollers 13 and 14 serving as the prime power-receiving means from the drive wheels of a motor vehicle or automobile in a manner which will be presently explained. Each shaft 11 and 12 adjacent to the one extremity and against the outer ends of the rollers 14 has a gear 15 mounted thereon, the two gears being continually held in mesh with an intermediate spur gear 16 of larger dimensions than the gears 15 and which serves as the power transmitting medium for the two shafts and their rollers. The spur gear 16 is mounted on a power transmitting shaft 17 held in suitable bearings on the centers of the bars 7 and 8 at one end of the frame, the said shaft 17 projecting outwardly a suitable distance beyond the one end bar 7 and having power transmitting pulleys or band wheels 18 and 19 of different dimensions fixed thereon. The gear 16 is loose on the shaft 17 and has a clutch hub 20 through which the said shaft extends, and coöperating with said hub is a clutch sleeve 21 which is shiftable to and from the hub 20 and is mounted to rotate with the shaft through the medium of a spline or key 22. The clutch sleeve 21 is operated to throw the shaft 17 into and out of connection with relation to the gear 16 and its hub 20 by a shifting lever 23 fulcrumed on a portion of the frame and extending transversely with relation to the latter over to one side or beyond one of the side bars 6 where it may be conveniently reached and operated, a suitably notched or toothed locking device 24 being provided on the beam 6 for locking the shifting lever in its adjusted position.

Hinged on the side bar 6 opposite that over which the lever 23 projects are a pair of inclines or wheel-engaging tilting runway sections 25, there being one of these incline or runway sections positioned to coöperate with a fixed incline or runway section 25$^a$ adjacent to one of each pair of rollers, and whereby the drive wheels of a motor vehicle or automobile may be run upwardly over the said inclines onto the adjacent roller of each pair of rollers and then between the pairs of rollers, as indicated by dotted lines in Figs. 4 and 5. The incline or runway sections 25$^a$ are fixed at a proper inclination relatively to the adjacent rollers on upright stops 26 held by the frame and extending fully across under the upper ends of the said incline sections. The stops 26 are of such height that the upper ends of the incline sections 25$^a$ will practically direct the drive wheels of the motor vehicle over and between and off from the adjacent rollers. The sections 25 when turned down in full lines as shown by Figs. 4 and 5 will have their lower free ends low enough to permit the motor vehicle wheels to run upwardly thereover, or downwardly therefrom to the ground surface, and when the said sections 25 are not in use they will be turned upwardly as shown in dotted lines to prevent injury thereto, particularly during transportation of the mechanism. Means are also provided for effecting a ready disengagement of the drive wheels of a motor vehicle from between the pairs of rollers, said means consisting of a shaft or tubular rod 27 mounted to rotate in the bars 9 and 10 and end bars 7 and 8, and having loops or rectangular removing members 28 between the rollers of each pair of the latter so as to be in position to engage the lower portions of the tires of the drive wheels of the motor vehicle and lift the latter high enough to clear the rollers and particularly the rollers adjacent to the incline or runway sections 25ª, when these drive wheels may then, through the operation of the motor vehicle, be caused to pass over said rollers onto the said sections 25ª and the sections 25 and then to the ground surface. The shaft or rod 27 is formed with a crank end 29 to which a link 30 is connected and to a shifting lever 31 fulcrumed on the adjacent end bar 7 and adapted to engage a locking device 32 whereby the rod or shaft 27 and the lifting members 28 may be fixed either in a lower or a raised position.

Either of the pulleys 18 or 19 on the outer end or extremity of the shaft 17 may be engaged by a power transmission belt 33 that may extend away any suitable distance from the power transmission mechanism to drive suitable machinery, and at any desired time the movement of either of the said pulleys and the belt that may be in engagement therewith may be checked or stopped by disconnecting the clutch sleeve 21 from the clutch hub 20.

To regulate the tension of the belt 33 or to take up the slack therein, a belt tightener is used and consists of a crank arm 34 mounted in the end bar 7 adjacent to the pulleys 18 and 19 and carrying a belt tightener roller 35 that may be caused to engage the belt 33, as shown by Fig. 4. The crank arm 34 has a shifting lever 36 connected to the inner end thereof and said lever is provided with a locking dog 37 to engage a toothed or notched segment or analogous device 38 and whereby the adjustment of the crank arm 34 and the roller 35 may be maintained and the latter held either in engagement with the belt or disengaged from the latter.

The improved mechanism is also provided with means for assisting in holding the same stationary when in operation, and also for rendering it readily portable. The means for holding the mechanism stationary consists of spikes 39 depending from the frame bars and particularly at the intersecting terminals of the bars 6 and 7, the spikes entering the ground surface when it is desired to use the coöperating mechanism and preventing the frame and mechanical parts carried thereby from shifting or becoming displaced from a desirable operative position. To render the mechanism portable, the frame has an axle 40 extending transversely thereacross and mounted in suitable bearings in the bars 6, said axle being provided with cranked ends 41 carrying ground wheels or rollers 42, and along one of the side bars 6 a lever 43 extends and is connected to the axle 40 and whereby the latter may be turned to lower the rollers or wheels 42 to raise the frame and the mechanism thereon above the ground surface and also cause the spikes 39 to become disengaged from the ground; and in such raised condition the entire mechanism may be transported, through the medium of a draft attachment 43, secured to the one end of the frame and preferably consisting of a yoke with a front coupling member or projection 44 adapted to receive a coupling link and pin or any other analogous device for attaching the mechanism to the rear of the motor vehicle that may have been used in operating the mechanism, or any other suitable transferring vehicle. By this means the improved mechanism may be readily disposed in position for operation and subsequently removed to any other point or place of storage that may be desired.

The improved mechanism also includes means for holding the drive wheels of the motor vehicle in operative engagement with the pairs of rollers 13 and 14, said means consisting of arms 44 movably attached to the transverse cross bars 9 and 10 in longitudinal alinement, each arm 44 having a slotted head 45 and a screw stem 46 with an upper hooked end 47, and extending downwardly into the arm and provided with an adjusting nut 48 within the slot of the head 45. The upper hooked ends 47 of the screw stems 46 are caught over the axle of the drive wheels of the motor vehicle, and then adjusted by operating the nuts 48 to hold the drive wheels down in frictional engagement with the pairs of rollers 13 and 14 with such tightness as to effect a uniform drive or operation of said rollers, and whereby the power of the drive wheels of the motor vehicle may be transmitted to the rollers 13 and 14 and from the latter by the gears 15 to the intermediate spur or main transmission gear 16. It is obvious that by connecting the clutch sleeve 21 with the hub 20 of the gear 16, the transmitted power concentrated on said gear may be in turn transmitted by the shaft 17 and either of the pulleys 18 and 19 to the mechanism to be driven by means of the belt 33.

It will be seen that the improved power transmission mechanism is comparatively simple in its construction and arrangement, and it is proposed to vary the proportions and dimensions thereof in accordance with the particular application to be made or the amount of power that may be desired to be transmitted therefrom. It will also be understood that in the use of the improved device the drive wheels of the motor vehicle are not in the least injured as they coöperate with the cylindrical surface of the pairs of rollers 13 and 14. The improved transmission mechanism also provides a thorough practical power transmission having a wide range of utility and especially adapted for farm work where mechanical engine-driven agricultural machinery is in demand and of great importance at the present time.

What I claim is:—

1. In a transmission mechanism of the class described, the combination of a frame having a pair of shafts mounted thereon, a roller mounted on each end of each shaft and providing pairs of rollers at opposite extremities of the mechanism, the one pair of rollers having gears at the outer ends thereof on the shafts, a centrally-located power transmitting shaft carrying pulleys on the outer end thereof, a main power transmitting gear between and continually meshing with the gears of the one pair of rollers and loosely mounted on the power transmitting shaft, clutch means for connecting the said main power transmitting gear to its shaft, means operatively disposed between the rollers to disengage and raise the drive wheels of the motor vehicle relatively to the rollers, and means for rendering the entire mechanism readily portable.

2. In a power transmitting mechanism of the class specified, the combination of a frame, a pair of shafts mounted on the frame, a roller mounted on the end of each shaft to provide a pair of rollers at opposite extremities of the mechanism, the rollers of each pair being disposed in spaced relation for engagement by the drive wheels of a motor vehicle, gear mechanism and a power transmitting shaft coöperating with the ends of one pair of rollers, movable inclines disposed in operative relation with one roller of each pair of rollers for permitting the drive wheels of a motor vehicle to move upwardly over and downwardly from the pairs of rollers, means for holding the drive wheels of a motor vehicle in fixed frictional engagement between the rollers of each pair of rollers, and a rotatable shaft having looped removing members disposed between the rollers of each pair of rollers to disengage and raise the drive wheels of the motor vehicle relatively to the rollers.

3. In a power transmission mechanism of the class specified, the combination of a frame having separated shafts and rollers thereon for engagement with the wheels of an automobile, and a rotatable means having loop members disposed between the rollers to disengage the drive wheels of the automobile relatively to the rollers.

In testimony whereof I have hereunto set my hand in presence of two subscribing witnesses.

JOHN IVAN MOORE.

Witnesses:
 JAS. W. HALL,
 LEWELLYN SMITH.